July 17, 1956     A. GORDON, JR     2,755,455

DEPTH SOUNDER

Filed Jan. 27, 1953

INVENTOR.
ALEXANDER GORDON JR.
BY
*H. L. Mackey*
ATTORNEY

United States Patent Office 2,755,455
Patented July 17, 1956

2,755,455

DEPTH SOUNDER

Alexander Gordon, Jr., Astoria, N. Y., assignor to General Precision Laboratory Incorporated, a corporation of New York Application January 27, 1953, Serial No. 333,553

5 Claims. (Cl. 340—3)

This invention relates to pulse type marine depth sounders where the length of the time interval between the transmission of a compression or sound wave and the reception of its echo reflected from a solid object, such as the ocean floor, provides an indication of the distance to the object or the depth of the water. More specifically the invention relates to an improvement in means for measuring the time interval representing the distance.

Sonic depth finders are well known in the prior art and various depth indicating means have been used with these devices. Such indicating means are fundamentally devices for measuring the short time interval between the transmission of the compression wave and the reception of its reflected echo. However, because of the necessary accuracy required these devices have usually been complex and very expensive.

The primary object of the present invention is to provide an improved, simple and inexpensive means for accurately indicating the time interval between the transmitted compression wave and its reflected echo.

Another object is to provide improved means of the type described using standard components which are usually manufactured in quantity production and therefore inexpensive and readily available. Other and further objects will become apparent from the following description when considered in connection with the accompanying drawings in which.

Briefly, the present invention provides means for periodically initiating the propagation of a compression or sound wave simultaneously with the synchronous operation of an indicator element.

The basic control is centered in an electrical pulse generator which assures that the initiation of the compression wave and the cycle of the indicator will be accurately synchronized. The reflected echo compression wave is utilized to periodically energize an inertialess flash lamp which momentarily illuminates the indicator element at its position in the cycle of operation, which for reasons hereinafter mentioned, represents the depth of the water or the distance to the object from which the compression wave is reflected. In the form of the invention described, an oscillating indicator element is illustrated although the provision of a continuously rotating indicator element is within the inventive concept.

In the preferred form an oscillating indicator needle and its associated scale are so shielded from the surrounding light that the contrast of the illumination of the indicator needle and the scale by the flash lamp with that of the surrounding light produces a stroboscopic effect.

Figure 1:
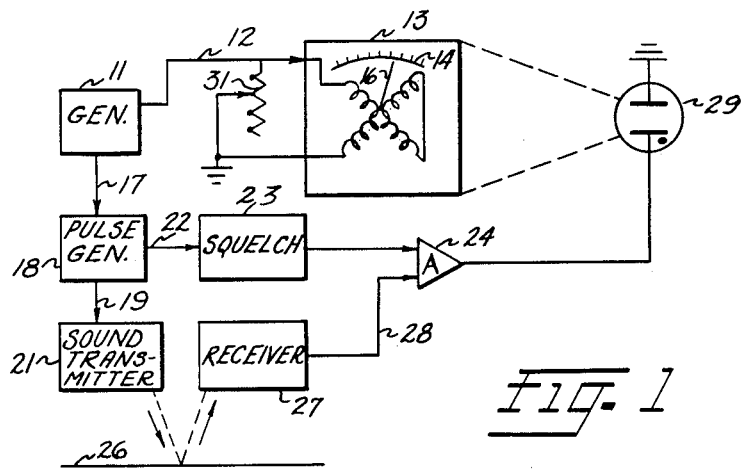
Figure 1 is a schematic illustration of the depth sounder in accordance with the present invention.

Referring specifically to Fig. 1, an alternating current generator 11 generates rectangular waves having a frequency equal to the number of pulses corresponding to the desired repetition frequency of the compression waves.

As will be seen from the following description, the frequency of the compression waves must be properly related to the distance to be measured and the scale of the indicating means. The rectangular wave train produced by the generator 11 is shown in the curve A, in Fig. 2.

The rectangular wave output from the generator 11 is used to simultaneously energize an electrical pulse generator 18 through the conductor 17 and an indicating meter 13, preferably of the electromagnetic type, through the conductor 12. The pulse generator 18 in turn supplies sharp electrical pulses through the conductor 19 to a sound transmitter 21 which propagates a compression wave at the same instant that the indicator needle 16 of the meter 13 begins its cycle of oscillation from left to right.

The meter 13 is provided with a suitable scale 14 which has its zero position on the left hand side and is calibrated in terms of distance, such as feet or fathoms. The meter 13 may be of the conventional electromagnetic type except that its indicator needle 16 is not biased to any zero position, the needle following as near as possible variations of the alternating current supplied from the generator 11 through the conductor 12. Preferably, suitable electrical and mechanical damping means are provided so that when their damping effects are combined with the inertia of the moving parts of the meter, the oscillations of the indicator 16 will be limited to full scale of the meter without damaging the latter. If the inertia resistance is much greater than the damping resistance, acceleration of the indicator needle 16 follows a nearly parabolic law, while if the damping resistance is much greater the law is nearly linear. The electrical meter 13 is so poled that the indicator needle 16 moves from the left to right on the up-going portion of the rectangular wave of curve A.

Figure 2:
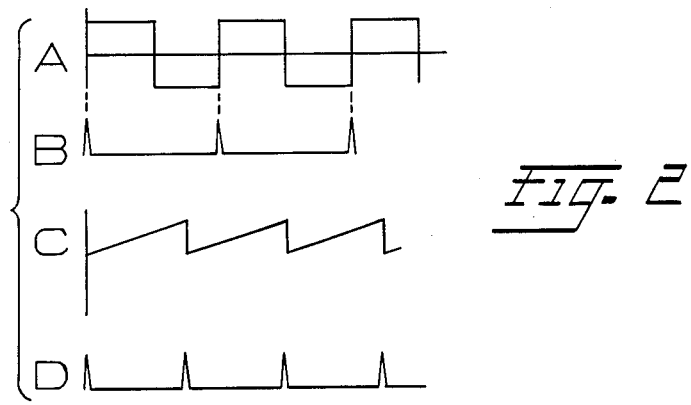
Figure 2 shows graphs illustrating the types of pulses supplied by electrical pulse generating means.
Figure 3:
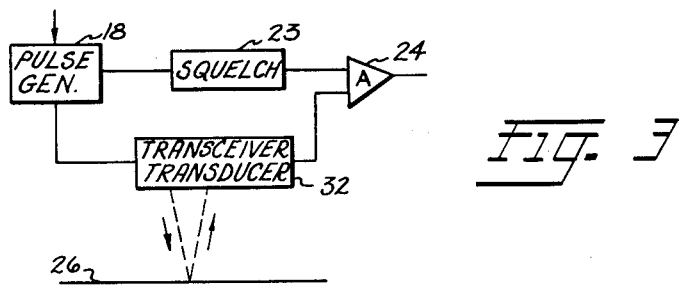
Figure 3 illustrates the use of a transceiver instead of the separate transmitter and receiver of the embodiment of Fig. 1.

The sharp electrical pulses generated by the pulse generator 18 at each up-going portion of the rectangular wave are represented by the curve B in Fig. 2. At the same time that the sharp electrical voltage pulses represented by the curve B are supplied to the sound transmitter-transducer 21 they are also supplied through the conductor 22 to a time-variation-of-grain (or squelch circuit) unit 23 which controls the gain of amplifier 24 which, in turn, amplifies the electrical pulses resulting from the reflected compression or sound waves received by the receiver-transducer 27.

The compression waves generated by the sound transmitter 21 are propagated through the water to the marine bottom, indicated at 26, or any other obstacle which it is desired to detect and these compression waves are reflected to the sound receiver-transducer 27 where the compression waves are translated into electrical pulses which are supplied through the conductor 28 to the controlled amplifier 24. The output of the amplifier 24, in the form of sharp voltage pulses, is supplied to the neon flash lamp 29. The latter is located in proximity to the face of the meter 13 in order to illuminate the indicator needle 16 and the scale 14. The purpose of the squelch circuit unit 23 is to make the amplifier 24 sensitive only during the time intervals during which it should receive the echo compression waves so that there will be no electrical energy leaked directly from the electrical generating components to the receiver circuit nor will there be any electrical disturbance in the receiver 27 due to the propagated compression waves. The squelch circuit unit 23 may be of the type described in Patent 2,476,902 entitled "Depth Sounder" by George R. Paine, dated July 19, 1949.

The neon flash lamp 29 is referred to as "inertialess" in the claims to indicate that it responds almost instantaneously to the electrical pulses from the receiver-transducer 27. In other words, the delay time of the lamp 29 is substantially negligible as compared to the time of travel of the compression wave.

In the operation of the device, at the instant that the electrical generator 11 initiates a rectangular wave the indicator needle 61 of the meter 13 will begin its cycle of oscillation from left to right and the generator 18 will be triggered to produce a sharp pulse which is translated by the transducer-transmitter 21 into a sharp compression wave propagated toward the marine floor 26. The sharp electrical pulse from generator 18 also desensitizes the amplifier 24 so that the flash lamp 29 will not be energized by any signal other than that resulting from an echo compression wave reflected from the marine floor 26 and received and translated by the receiver-transducer 27. The distance on the scale between the zero position and the instantaneous position at which the needle 16 has arrived at the time that the lamp 29 flashes as a result of the echo compression wave, represents the time interval between the propagation of the compression wave from the transmitter 21 and its reception by the receiver-transducer 27. It is well understood that this time interval corresponds to the time of travel through water which is double the depth to be indicated and the scale is calibrated accordingly so that it reads directly in terms of the actual depth.

As an example, let it be supposed that the generator 11 generates a rectangular wave having a period of two seconds and that the indicator needle 16 requires one second to move from its zero position to its full scale position when its motion is highly damped and substantially linear. The indicator needle 16 moves from zero to its maximum position during the first half cycle of the rectangular electrical pulse supplied by the generator 11. Since the compression wave is propagated from the sound transmitter 21 at the same instant that the indicator needle starts its movement, if the depth of the water is 400 fathoms or less the echo will return in one second or less causing the lamp 29 to flash and illuminate the dial 14 and indicator needle 16 so that the observer will see the indicator needle 16 at an instantaneous position corresponding to the depth. This indication will be repeated every two seconds and as the depth changes the position of the indicator needle 16 at the instant of illumination will change. It will be readily recognized that this is a stroboscopic effect.

If the water depth to be measured is greater than 400 fathoms it will be necessary that the pulse rate be decreased and a different scale be used. For instance, if it is desired to measure depth up to 800 fathoms, the pulse rate must be decreased to one pulse every four seconds and the scale 14 must be calibrated from zero to 800 fathoms. Also, the damping of the meter 13 must be changed so that under the influence of the rectangular voltage steps the indicator needle 16 takes two seconds to traverse its scale. Suitable adjustable electrical damping means is indicated at 31 in Fig. 1.

A transceiver-transducer 32 may be employed instead of the separate transmitter-transducer 21 and the associated receiver-transducer 27 as shown in Fig. 1. Also, the generator 11 may be so designed as to produce a saw-tooth wave form such as that shown at C in Fig. 2 instead of the rectangular wave shown by curve A. In this instance, at the same time that the generator 11 produces the saw-tooth wave form the pulse generator 18 produces a wave form including the sharp peaked pulses coinciding with the steep wave fronts as indicated by the relation of the curves C and D of Fig. 2. When using a saw-tooth wave generator the indicator needle 16 of the meter 3 would be provided with a linear tension spring so that its retracting force would increase at a substantially straight line relation with the increase in the saw-tooth voltage. Under these conditions the indicator needle 16 would substantially follow the saw-tooth voltage linearly from zero at the left hand side of the scale 14 to its maximum position on the right and then return very quickly to its zero position to start its next cycle. If a 400 fathom depth limit is desired, the scale 14 would have to be calibrated for a maximum echo time of one second, as in the first instance described, but in the present instance the pulse length period would also be one second. Accordingly, it will be necessary to provide appropriate damping of the indicator needle 16 to facilitate its movement in synchronism with the saw-tooth voltage. It will be readily apparent that due to inherent mechanical inertia of the mechanical elements, it would be impossible for the indicator needle 16 to follow precisely the saw-tooth wave of curve C in Figure 2, but it would be possible that the needle would follow the curve close enough to have a large portion of the scale give accurate indications.

Instead of the electromagnetic type meter 13 for indicating depth, a small synchronous motor of conventional construction and utilizing a light weight rotor could be used. In such instance, scale calibrations distributed over 360° could be placed on the rotating element or a fixed 360° scale could be operatively associated with an indicator element continuously rotated by the synchronous motor.

It will be apparent that the foregoing provides an improved depth sounder which is basically simple, inexpensive and uses an operating mechanical element which is synchronously operated by the same master electrical generator which also initiates the compression sound waves. Since the oscillating element has a periodic oscillatory motion, the illumination by the flash lamp resulting from the echo compression waves provides a simple and convenient means for indicating the elapsed time from the beginning of the propagation of the compression wave and the reception of the reflected echo wave.

It will be readily apparent that there are various details which may be varied without departing from the inventive concept described above.

What is claimed is:

1. In a depth sounder, means for generating electric reference timing pulses, a movable element adapted to be operated by said pulses in synchronism therewith, a second pulse generator triggered by said electric reference timing pulses, a transducer energized by the pulses from said second pulse generator for propagating mechanical compression waves, a receiver, transducer responsive to reflected echo compression waves for producing electrical pulses corresponding to said reflected compression waves, and an intertialess glow discharge illuminating device energized by the electric pulses from said receiver-transducer, said illuminating device being disposed adjacent said movable element for intermittent illumination of the latter.

2. In a depth sounder, means for generating electric reference pulses, an oscillating element adapted to be synchronously operated by said timing pulses, a second pulse generator triggered by said timing pulses, a transducer energized by the output of said latter pulse generator for propagating compression waves, a receiver-transducer for receiving reflected echo compression waves and translating the latter into electrical pulses, a glow discharge lamp mounted adjacent said oscillating indicator element and adapted to provide intermittent instantaneous illumination of the latter in response to reflected compression waves.

3. A depth sounder comprising, an altenating current generating means for producing electrical timing pulses, an indicating meter having a scale and an indicator element adapted to be cyclically oscillated adjacent said scale in synchronism with said timing pulses produced by said alternating current generator, transducer means operated by said timing pulses for generating compression waves in synchronism with said electrical timing pulses, receiver-transducer means for receiving and translating reflected compression waves into electrical pulses, a glow discharge lamp positioned to illuminate said scale and said indicator element of said meter and means responsive to the output of said receiver-transducer means and controlled by said timing pulses for causing said glow discharge lamp to illuminate said scale and indicator element in instantaneous flashes in synchronism with said echo compression waves whereby the position of said indicator element on said scale when illuminated by said lamp represents echo time and water depth.

4. A depth sounder comprising, an alternating current generator for producing timing pulses, an indicating meter actuated by the output of said alternating current generator, said meter having a scale and an oscillating indicator element, a pulse generator triggered by the output of said alternating current timing generator, a squelch circuit unit operated by the timing pulses of said first generator, an amplifier controlled by said squelch circuit unit to make the latter insensitive during the generation of a pulse by said second generator, a transducer operated by the pulses from said second generator to propagate compression waves, a receiver-transducer positioned to receive reflected echo compression waves, connection means for applying the output of said receiver-transducer to said amplifier and a gas filled electric glow discharge lamp connected for operation by said amplifier and positioned to illuminate said scale and said indicator element.

5. A depth sounder comprising, a first generator for generating an alternating rectangular wave current, an indicating meter having a freely pivoted indicator element, said meter being energized by the output of said generator and causing said indicator element to pivotally oscillate synchronously with the output of said generator, a pulse generator triggered by the output of said first generator, a squelch circuit operated by the pulses from said pulse generator, an amplifier made insensitive by the output of said squelch circuit during generation of pulses in said pulse generator, a transmitter-transducer responsive to the output of said pulse generator to generate compression waves, a receiver-transducer positioned to receive and translate reflected compression waves to electrical impulses, connection means for applying the output of said receiver-transducer to said amplifier and a gas filled electric glow discharge flash lamp connected for operation by the output from said amplifier and to intermittently illuminate said scale and indicator element.

References Cited in the file of this patent

UNITED STATES PATENTS

| | | |
|---|---|---|
| 2,028,174 | Turner | Jan. 21, 1936 |
| 2,400,796 | Watts | May 21, 1946 |
| 2,502,938 | Fryklund | Apr. 4, 1950 |